United States Patent
Majidian et al.

(10) Patent No.: US 10,289,609 B2
(45) Date of Patent: May 14, 2019

(54) DATA PROCESSING, APPARATUS AND METHODS

(71) Applicant: BRITISH TELECOMMUNICATIONS public limited company, London (GB)

(72) Inventors: Andrei Majidian, London (GB); Trevor Martin, London (GB)

(73) Assignee: British Telecommunications PLC, London (GB)

( * ) Notice: Subject to any disclaimer, the term of this patent is extended or adjusted under 35 U.S.C. 154(b) by 631 days.

(21) Appl. No.: 14/389,299

(22) PCT Filed: Mar. 28, 2013

(86) PCT No.: PCT/GB2013/000144
§ 371 (c)(1),
(2) Date: Sep. 29, 2014

(87) PCT Pub. No.: WO2013/144552
PCT Pub. Date: Oct. 3, 2013

(65) Prior Publication Data
US 2015/0066944 A1    Mar. 5, 2015

(30) Foreign Application Priority Data

Mar. 29, 2012 (EP) .................................... 12250077

(51) Int. Cl.
G06F 16/22 (2019.01)
G06F 16/245 (2019.01)
G06N 5/04 (2006.01)
G06F 16/901 (2019.01)
G06F 16/36 (2019.01)

(52) U.S. Cl.
CPC ........ G06F 16/2228 (2019.01); G06F 16/245 (2019.01); G06F 16/36 (2019.01); G06F 16/9024 (2019.01); G06N 5/048 (2013.01)

(58) Field of Classification Search
CPC ........ G06F 17/30321; G06F 17/30424; G06F 17/30731
See application file for complete search history.

(56) References Cited

PUBLICATIONS

Zhou et al, "Fuzzy Concept Lattice based Classifier", Fourth International Conference on Fuzzy Systems and Knowledge Discovery (FSKD 2007), 5 pages.*

(Continued)

Primary Examiner — Loc Tran
(74) Attorney, Agent, or Firm — Nixon & Vanderhye PC

(57) ABSTRACT

The invention provides an apparatus for processing data items in a data source, and an equivalent method. More specifically, the apparatus is configured to reduce a lattice representation of data items in a data source. The apparatus has a processor that is operable to retrieve data items from the data source and to determine a context defining relationships between data items and one or more properties associated with the data items. An initial lattice data structure is generated based on the determined context. The processor then reduces the size of the lattice by dividing the initial lattice data structure into a plurality of subgroup lattice, reducing the size of each of the subgroups of lattice, and combining them to form a reduced lattice data structure.

15 Claims, 8 Drawing Sheets

(56) References Cited

PUBLICATIONS

Anna Formica, "Semantic Web search based on rough sets and Fuzzy Formal Concept Analysis", Knowledge-Based System, 2011 Elsevier B.V. All rights reserved, 8 pages.*

Zhou et al, "Fuzzy Concept Lattice based Classifier", 2007, FSKD, 5 pages.*

Anna Formice, "Semantic Web Search based on Rough Sets and Fuzzy Concept Analysis", journal 2011, 8 pages.*

Zhou et al., "Fuzzy Concept Lattice Based Classifier", Fourth International Conference on Fuzzy Systems and Knowledge Discovery, IEEE, Aug. 2007, pp. 598-602.

Formica, "Semantic Web search based on rough sets and Fuzzy Formal Concept Analysis", Knowledge-Based Systems, vol. 26, Journal Knosys, Jun. 24, 2011, pp. 40-47.

International Search Report for PCT/GB2013/000144, dated Apr. 26, 2013.

* cited by examiner

|  | Video | Audio | Telecommunication |
|---|---|---|---|
| Digital Camera | 1 | 0 | 0 |
| Camcorder | 1 | 0 | 0 |
| Cassette Player | 0 | 1 | 0 |
| CD Player | 0 | 1 | 0 |
| mp3 Player | 0 | 1 | 0 |
| Telephone | 0 | 0 | 1 |
| Mobile Phone | 1 | 1 | 1 |

|  | Comedy | Horror | Romance |
|---|---|---|---|
| Movie 1 | 0.8 | 0 | 0.7 |
| Movie 2 | 0.6 | 0.5 | 0 |

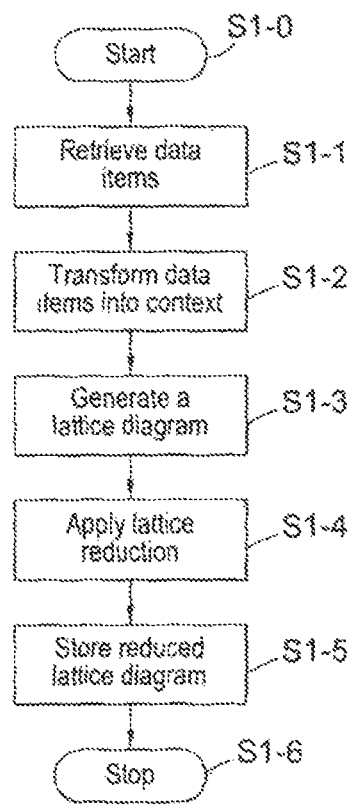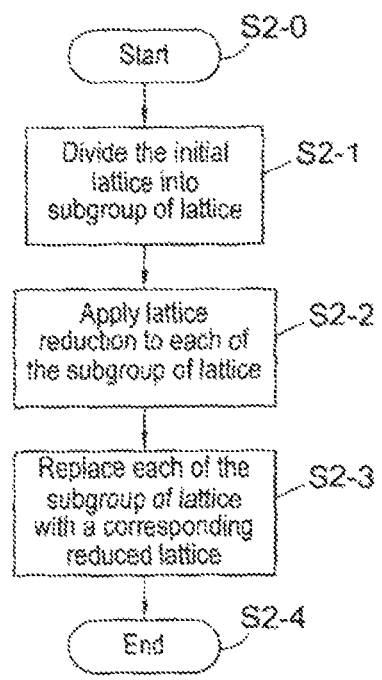
Fig. 7
Fig. 8

DATA PROCESSING, APPARATUS AND METHODS

This application is the U.S. national phase of International Application No. PCT/GB2013/000144, filed 28 Mar. 2013, which designated the U.S. and claims priority to EP Application No. 12250077.0, filed 29 Mar. 2012, the entire contents of each of which are hereby incorporated by reference.

TECHNICAL FIELD

The invention generally relates to data processing, and in particular, it relates to methods of reducing data in a data source. The invention also relates to methods of retrieving data from a data source.

BACKGROUND AND SUMMARY

Information overloading in computer networks and in data sources is a widely recognized yet largely unsolved problem. Sufferers include knowledge workers searching for the "right" information, analysts evaluating and summarizing customer concerns and feedback in the light of ever-changing products and services, managers trying to make predictions and decisions based on monitoring complex business processes, customers looking for help, and so on.

When faced with a large volume of data, a natural human approach is to "divide and conquer", i.e. to look for similarities and group together closely equivalent items, in a taxonomic or hierarchical fashion. Frequently, this analysis can lead to generally accepted hierarchical classification schemes. For example, data items in a data source relating to items in a supermarket or web-based retailer, or to product catalogues, topics in an online discussion forum, software component libraries, or scientific literature, inter alia, use "divide and conquer" style taxonomies.

FIG. 1 shows an example of data items arranged in a hierarchical structure of classification scheme. The structure is a tree shape, with a top level node 100, and a number of second level nodes 110, 120, 130 linked to the top level node 100 by branches. Second level node 110 is connected to third level nodes 112 and 114, second level node 120 is connected to third level nodes 122, 124, 126, and second level node 130 is connected to third level nodes 132, 134. Each node has a node name. Each node at each level of the hierarchy is associated with a data item in a database. In the present example, the database relates to electronic products, and the top level node 100 is named "Electronic Products". The second level nodes are named "Video", "Audio", and "Telecommunication". The third levels nodes are named as subsets of the second level nodes, and are named "Digital Camera", "Camcorder", "Cassette Player", "CD Player", "MP3 Player", "Telephone", and "Mobile Phone". It is noted that it is not essential that all bottom level nodes are all at the same level in the hierarchy.

Data items in a database are generally organized in conceptual structures that define the conceptual relationships among data items to allow data to be expressed in a useful format. As an example, the collection of electronic products described in the preceding paragraphs may be considered as the objects of interest, namely: "Digital Camera", "Camcorder", "Cassette Player", "CD Player", "MP3 Player", "Telephone", and "Mobile Phone". The attributes of these objects are identified as "Audio", "Video", and "Telecommunication". The identification of objects and attributes allows a context to be determined. Essentially, the context defines the relationships between the objects and the attributes.

As illustrated in FIG. 2, a context is represented as a table in an array of rows and columns. However, it will be appreciated by the skilled person in the art that a context may be represented in other formats. In the table, the rows are labelled by objects, and the columns are labelled by attributes. As shown in the table of FIG. 2, a "1" indicates that an object possesses the attribute, whereas a "0" indicates absence of the attribute. For example, a digital camera is associated with the attribute "Video". In another example, a mobile phone is associated with the attributes "Video", "Audio", and "Telecommunication".

The context in FIG. 2 is commonly represented by a lattice diagram generated using Formal Concept Analysis (FCA). A lattice diagram generated from the context of FIG. 2 is illustrated in FIG. 3. Each node in the lattice diagram represents a set of zero, one or more of the attributes from the context and the set of zero, one or more of the objects from the context which has that set of attributes.

The lattice diagram in FIG. 3 begins from a common node 200, and a number of first level nodes 202, 204, 206 linked to the common node 200 by branches. Each of the first level nodes is connected to its corresponding second level node 208. In FIG. 3, each of the first and second level nodes is associated with a product (or set of products) (for example: digital camera (DC), telephone, or mp3 player (mp3)), and each product (or set of products) associated with a node has all of the attributes associated with the same node (e.g. node 202 is associated with the sole attribute Video (V) and the products Digital Camera (DC) and Camcorder (C)). As shown in FIG. 3, the lower half of each node is shaded to represent an associated object (or set of objects). The upper half of a node is "cross hatched" to represent the highest node corresponding to an attribute. The second level node 208 in this example is associated with all three attributes (Video (V), Telecommunication (T), and Audio (A)) and with the (single) device with all the three attributes (the Mobile Phone MP).

However, categorization of data items may be based on subjective criteria, rather than objective definitions. For example, in categorizing data relating to films, there is no clear definition as to whether a film falls in a specific category, such as comedy or drama. Fuzzy set theory that applies graded membership to objects in a context is generally used to categorize this type of data. The graded membership simply assigns "0" and "1" to correspond to non-membership and full membership respectively, and any number in the range of 0 to 1 to represent an ordered scale of intermediate membership.

An example of the fuzzy set theory applied to data relating to films is illustrated in FIG. 4. As shown in the table of FIG. 4, a graded membership is used to indicate the scale in which an object possesses an attribute, and a "0" indicates absence of the attribute. For example, a romantic comedy (Movie 1) may be graded as "0.8" under comedy, and "0.7" under romance.

Similarly, the context in FIG. 4 can be represented by a lattice diagram generated using fuzzy FCA. A lattice diagram generated from a context determined based on fuzzy set theory is illustrated in FIG. 5. However, as shown in FIG. 5, a fuzzy formal concept lattice can be very complex, due to a large number of concepts which differ slightly in membership. The complex appearance of the lattice diagram is unlikely to provide useful information to a user. Furthermore, it will be appreciated by a skilled person that a complex and large lattice requires more memory and is computationally less efficient. Thus, it is desirable to reduce the size of a lattice diagram such that it is represented in a useful and manageable form. It is also desirable to retrieve data from a data source in an efficient manner.

"Fuzzy Concept Lattice Based Classifier" by Wen Zhou et al (published in the proceedings of the Pourth International Conference on Fuzzy Systems and Knowledge Discovery, FSKD 2007 on 1 Aug. 2007 at pages 598-602, XP031192478, IEEE, Piscataway, N.J., US ISBN: 978-0-7695-2874-8) proposes a method for compressing a lattice formed using Formal Concept Analysis (FCA) in order to address the problem that the use of FCA generates very large and complex lattices. However, although it wishes to address fuzzy memberships, it actually proceeds in its method by firstly crispening the lattice before then reducing it (see especially Definition 2 of the paper where it selects the extents and intents of the concepts using a windowing technique which selects crisp members only (based on whether their membership falls within or without a window).

The invention in certain example embodiments provides a method for processing data items in a data source, and an equivalent apparatus. More specifically, the method reduces a lattice representation of data items in a data source. The method comprises the steps of retrieving data items from the data source and determining a context defining relationships between data items and one or more properties associated with the data items. An initial lattice data structure is generated based on the determined context. The size of the lattice is reduced by dividing the initial lattice data structure into a plurality of subgroups of lattice (or lattice subgroups), reducing the size of each of the lattice subgroups, and combining them to form a reduced lattice data structure. The invention in certain example embodiments provides a data structure that is less complex and represents more relevant, useful information. The data also occupy less memory space and subsequent operations on or using the data are computationally more efficient. For example, in an online shopping recommendation system, "outlier" purchases would tend to be ignored by the recommendation system, thereby providing the shopper with more relevant recommendations. The reduced data can also be stored on a handheld device without occupying significant memory space.

In a first aspect of the invention there is provided a method for processing data items in a data source, wherein each of the data items comprises one or more properties associated therewith, the method comprising determining a context defining relationships between the data items and the associated one or more properties, generating an initial lattice data structure based on said context, wherein said initial lattice comprises a plurality of nodes, a node representing one of said one or more properties, and one or more data items are associated with nodes of said plurality of nodes such that data items that are associated with the same node are associated with the same property, and reducing the initial lattice by removing nodes within the initial lattice such that the number of nodes in the reduced lattice is less than the number of nodes in the initial lattice.

The step of reducing the initial lattice may further comprise the step of dividing said initial lattice into a plurality of subgroups of lattice such that a subgroup of lattice comprises a subset of said plurality of nodes, and applying lattice reduction to reduce one or more of said subgroup of lattice.

Preferably the initial lattice and each subgroup are fuzzy lattices (in as much as one or other of the extent or intent or both of at least some of the nodes of the lattice have non crisp values—e.g. a node may have an intent of Comedy and an extent of Movie_1/0.8 and Movie_2/0.6). Equivalently, the lattices may be considered as being fuzzy lattices if one or both of the total intent and total extent of the lattice are fuzzy sets.

In a preferred embodiment, the lattices are fuzzy lattices for which each node in the lattice represents a concept and each concept can be defined as a fuzzy formal concept comprising a pair X, Y where X is a fuzzy set of objects and Y is a crisp set of attributes such that $X\uparrow=Y$ and $Y\downarrow=X$ where we adopt the usual definition of equality for fuzzy sets (any element has identical membership in both sets) and $$X^\uparrow = \{y \in Y \mid \forall x \in X : \mu_R(x, y) \geq \mu_X(x)\} \quad (1)$$

$$Y^\downarrow = \left\{x/\mu_X(x) \mid \mu_X(x) = \min_{y \in Y}(\mu_R(x, y))\right\} \quad (2)$$

Preferably, within each lattice subgroup we keep at least one maximal and at least one minimal node.

The nodes in said subgroup of lattice are within a predetermined threshold distance of one another, the predetermined threshold distance representing a limit in which data items associated with nodes in a same subgroup lattice differs.

Thus, the objects represented in each node in a subgroup of lattice are closely related to the objects represented by the remaining nodes in the same subgroup. Effectively, this allows objects that are closely related to be grouped together. This provides an advantage that when a search is carried out on the lattice, the search can be focused on a portion of the lattice rather than the global lattice to allow the search to be conducted more efficiently.

Said subgroup of lattice may be reduced by extracting a minimal node of said subgroup, the minimal node having one or more data items that associate with properties represented by nodes in said subgroup.

Since the minimal node of a subgroup represents the objects that have all the attributes in that subgroup, the remaining nodes in the subgroup can be removed. This results in the data occupying less memory space.

The method may further comprise the step of combining said extracted minimal node of said subgroups of lattice to form the reduced lattice.

The data items and the associated properties in each node may be, respectively, objects and attributes of a fuzzy set.

The context may be represented as a table in an array of rows and columns, the rows being labelled by objects and the columns labelled by attributes.

The method of the above aspect may further comprise receiving user input including a search query term, searching through said reduced lattice to select at least one node from the reduced lattice based on said search query term and providing an output representing at least one data item that is associated with said selected at least one node.

In a second aspect of the invention there is provided a method for retrieving at least one data item relating to a search query term, the method comprising receiving user input including a search query term, retrieving data items from a data source, wherein each data item comprises one or more properties associated therewith, determining a context defining relationships between the data items and the associated one or more properties, generating an initial lattice data structure based on said context, wherein said initial lattice comprises a plurality of nodes, a node representing one of said one or more properties, and one or more data items are associated with nodes of said plurality of nodes such that data items that are associated with the same node are associated with the same property, reducing the initial lattice by removing nodes within the initial lattice such that the number of nodes in the reduced lattice is less than the number of nodes in the initial lattice, searching through said reduced lattice to select at least one node from the reduced lattice based on said search query term, and providing an output representing at least one data item that is associated with said selected at least one node.

In a third aspect of the invention there is provided a method for retrieving at least one data item relating to a search query term, the system comprising receiving user input including a search query term, searching through a data source storing data items represented by a reduced lattice data structure generated by removing nodes within an initial lattice data structure such that the number of nodes in the reduced lattice is less than the number of nodes in the initial lattice, selecting at least one node from the reduced lattice based on said search query term, and providing an output comprising at least one data item that is associated with said selected at least one node.

In a fourth aspect of the invention there is provided an apparatus for processing data items in a data source, wherein each of the data items comprises one or more properties associated therewith, the apparatus comprising a processor operable to:
  determine a context defining relationships between the data items and the associated one or more properties;
  generate an initial lattice data structure based on said context, wherein said initial lattice comprises a plurality of nodes, a node representing one of said one or more properties, and one or more data items are associated with nodes of said plurality of nodes such that data items that are associated with the same node are associated with the same property; and
  reduce the initial lattice by removing nodes within the initial lattice such that the number of nodes in the reduced lattice is less than the number of nodes in the initial lattice.

The apparatus may further comprise a user input for receiving user input including a search query term, a searching module for searching through said reduced lattice to select at least one node from the reduced lattice based on said search query term, and a data output operable to output at least one data item that is associated with said selected at least one node.

Preferably, the apparatus stores the full initial lattice as well as the reduced lattice and permits, via the user interface, a user to navigate through the reduced lattice and to expand sub-groups to permit navigation through a sub-group where the sub-group is expanded to be as it is in the initial lattice prior to any reduction having taken place to generate the reduced lattice.

In a fifth aspect of the invention there is provided a system for retrieving at least one data item relating to a search query term, the system comprising a data source for storing data items represented by a reduced lattice data structure generated by removing nodes within an initial lattice data structure such that the number of nodes in the reduced lattice is less than the number of nodes in the initial lattice, a user input device for receiving user input including a search query term, a searching module for searching through said reduced lattice to select at least one node from the reduced lattice based on said search query term, and a data output operable to output at least one data item that is associated with said selected at least one node.

The reduced lattice data structure may comprise a plurality of nodes, a node representing one or more properties associated with one or more said data items, wherein the reduced lattice is reduced from said initial lattice by dividing said initial lattice into a plurality of subgroups of lattice such that a subgroup of lattice comprises a subset of said plurality of nodes, extracting a minimal node of said subgroup, the minimal node having one or more data items that are associated with properties represented by nodes in said subgroup, combining said extracted minimal node of each of said subgroups of lattice to form the reduced lattice.

According to a sixth aspect of the invention there is provided a method for processing data items in a data source, wherein each of the data items comprises one or more properties associated therewith, the method comprising determining a context defining fuzzy relationships between the data items and the associated one or more properties, generating an initial fuzzy lattice data structure based on said context, wherein said initial lattice comprises a plurality of nodes, a node representing one of said one or more properties, and one or more data items are associated with nodes of said plurality of nodes such that data items that are associated with the same node are associated with the same property, and
  reducing the initial fuzzy lattice by removing nodes within the initial lattice such that the number of nodes in the reduced fuzzy lattice is less than the number of nodes in the initial fuzzy lattice.

The step of reducing the initial fuzzy lattice may further comprise the step of dividing said initial fuzzy lattice into a plurality of fuzzy lattice subgroups such that a fuzzy lattice subgroup comprises a subset of said plurality of nodes, and applying lattice reduction to reduce one or more of said fuzzy lattice subgroups.

One embodiment provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configure by suitable software, or a combination of both. Aspects can be embodied in a software product, either as a complete software implementation, or as an add-on component for modification or enhancement of existing software (such as a plug in). Such a software product could be embodied in, a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

DESCRIPTION OF THE DRAWINGS

Embodiments will be described with reference to the accompanying drawings, in which:

FIG. 7 is a flow chart showing a process for reducing data items in a data source according to an embodiment of the invention;

FIG. 8 is a flow chart showing a process for reducing a lattice diagram according to an embodiment of the invention;

DETAILED DESCRIPTION

Specific embodiments will be described in further detail in the following paragraphs on the basis of the attached figures. It will be appreciated that this is by way of example only; and should not be viewed as presenting any limitation on the scope of protection.

Figure 6:
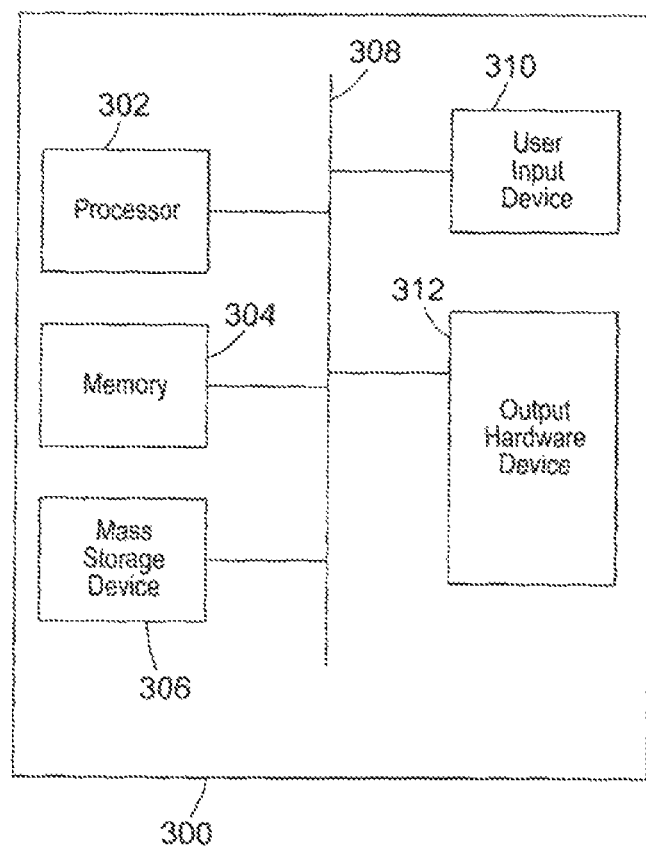
FIG. 6 is a block diagram showing an apparatus according to an embodiment of the invention.

FIG. 6 is a block diagram showing an apparatus according to an embodiment of the invention. The apparatus 300 comprises a processor 302 operable to execute machine code instructions stored in a working memory 304 and/or retrievable from a mass storage device 306. In this example, the mass storage device 306 stores data to be accessed. Alternatively, the mass storage device 306 is not part of the apparatus and in this case the apparatus includes an interface for accessing data stored in an external data source. The interface can comprise a port or connector to allow the apparatus to be connected to access the data source, or the interface may comprise a network interface.

By means of a general purpose bus 308, a user operable input device 310 is capable of communication with the processor 302. The user operable input device 310 comprises, in this example, a keyboard or a mouse though it will be appreciated that any other input devices could also or alternatively be provided, such as another type of pointing device, a touch-sensitive tablet, speech recognition means, or any other means by which a user input action can be interpreted and converted into data signals.

Audio/video output hardware devices 312 are further connected to the general purpose bus 308, for output of information to a user. Audio/video output hardware devices 312 can include a visual display unit, speaker or any other device capable of presenting information to a user.

A process of reducing data in a data source according to an embodiment of the invention will now be described with reference to the flow chart of FIG. 7. The process begins at step S1-0.

Step S1-1: The processor 302 retrieves data items from a data source such as a mass storage device 306.

Figure 1:
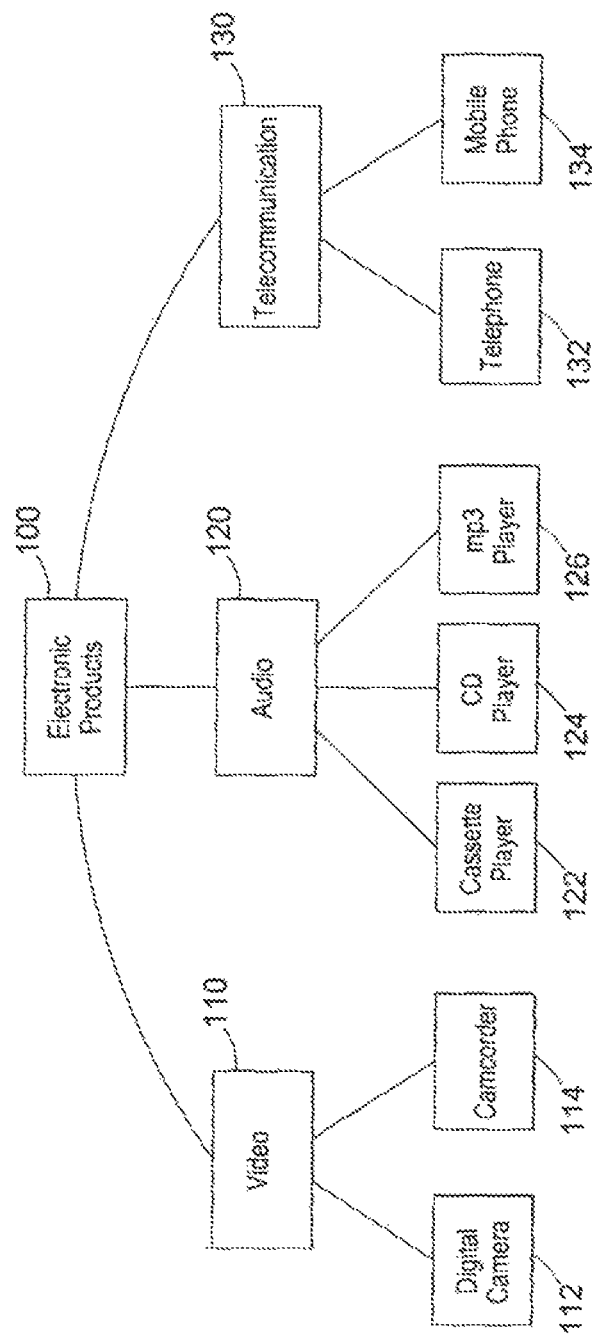
FIG. 1 is a tree diagram showing data items of a database system.
Figures 2, 3:
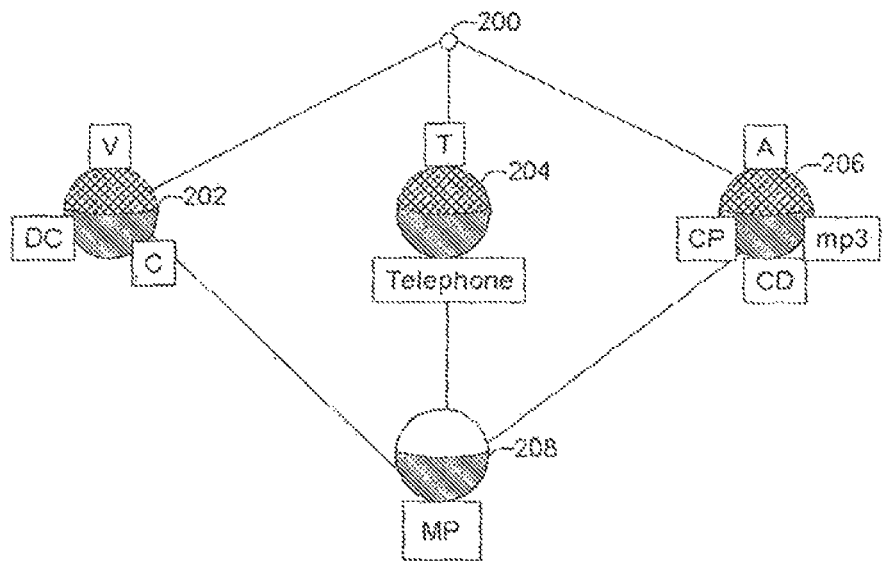
FIG. 2 is a context defining objects and attributes of data items illustrated in the form of a table.
FIG. 3 is a lattice diagram constructed from the context of FIG. 2.
Figures 4, 5:
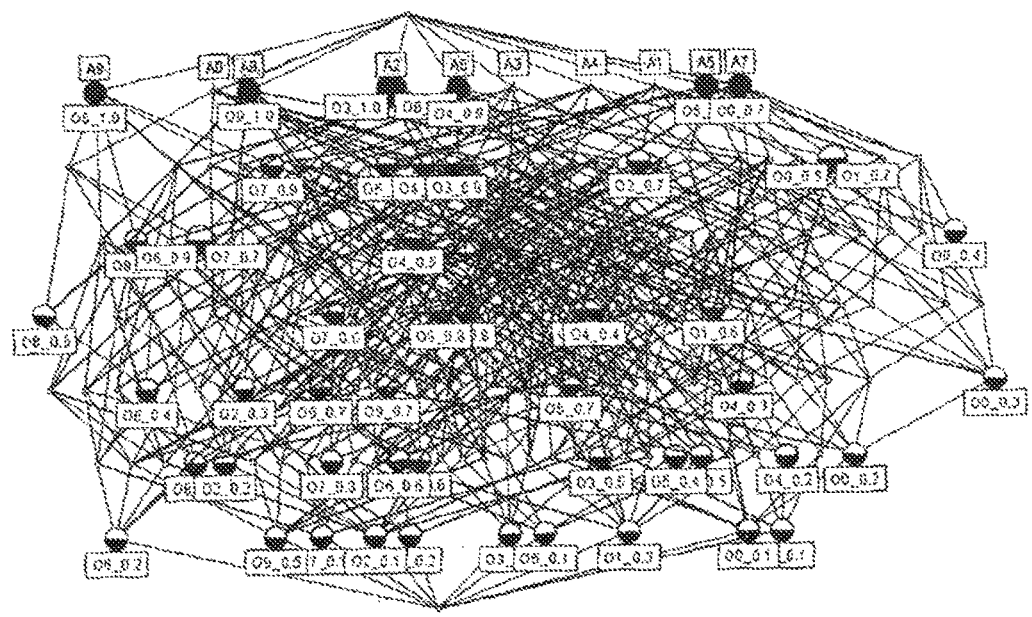
FIG. 4 is a fuzzy set context illustrated in the form of a table.
FIG. 5 is an example of a lattice diagram constructed from a fuzzy set context.

Step S1-2: The processor 302 transforms the retrieved data items into a format that defines conceptual relationships among the data items, such as the table formats described above with reference to FIGS. 2 and 4. It is noted that the method of the embodiments of the invention can be applied to objects with graded membership and objects with non-graded membership, although it is noted that greater benefit can be obtained when the method is applied to objects with graded membership, i.e. objects with fuzzy membership of a class.

Step S1-3: The processor 302 generates an initial lattice diagram from the context of the data using FCA. It will be appreciated by the person skilled in the art that any suitable method of generating the initial lattice diagram may be employed, and therefore details of generating the initial lattice diagram by, the processor 302 will not be described. The term "initial lattice diagram" as used herein preferably connotes a lattice diagram that is generated using data items in the data source.

Step S1-4: The processor 302 applies lattice reduction to the initial lattice diagram generated in step S1-3. The specific method of the lattice reduction will be described in due course.

Step S1-5: The processor 302 passes the reduced lattice back to the data source. As the number of data items represented by the reduced lattice diagram is considerable smaller than the initial lattice diagram, the data items are now stored in a relatively small area of memory. The term "reduced lattice diagram" as used herein preferably connotes a lattice diagram that has been reduced from the initial lattice diagram.

The process terminates at step S1-6.

The lattice reduction process, performed by the processor 302, according to the process described above will now be described with reference to the flow chart of FIG. 8. The process begins at step S2-0.

Step S2-1: The processor 302 divides the initial lattice diagram into subgroups of lattices. As will be described in the forthcoming paragraphs, the initial lattice diagram can be divided by clustering nodes of the initial lattice diagram.

Step S2-2: The processor 302 applies lattice reduction to each of the subgroups to reduce the size of each subgroup.

Figure 9:
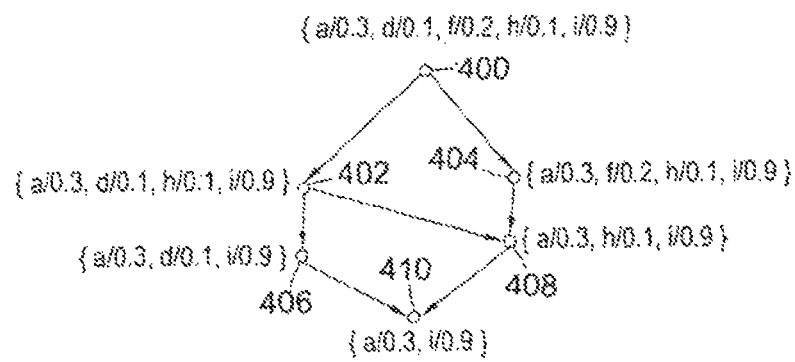
FIG. 9 illustrates a subgroup lattice of a lattice diagram.

FIG. 9 shows a subgroup lattice as an example. It will be appreciated by a person skilled in the art of FCA that each node in FIG. 9 represents a combination of a set of attributes and an associated set of objects (each of which is associated with those attributes). It will be understood that each node can be uniquely identified by specifying either the associated set of objects or the associated set of attributes. In FIG. 9, each node is specified only by reference to the set of objects associated with each node. Furthermore, since FIG. 9 illustrates a subgroup of a fuzzy FCA lattice each object additionally specifies a membership value to the combination of attributes associated with the respective node. The upper most node 400 represents the set of attributes that all objects in that subgroup have (together with all the objects in the subgroup), while the lowest node represents the set of all of the attributes associated with the subgroup (and the set of objects in the subgroup that have all the attributes).

Two first level nodes 402, 404 are connected to the top level node 400 by branches. The fuzzy set in the first level node 402 is expressed as {a/0.3, d/0.1, h/0.1, i/0.9}, and the fuzzy set in the first level node 404 is expressed as {a/0.3, f/0.2, h/0.1, i/0.9}. A second level node 406 has a fuzzy set of {a/0.3, d/0.1, i/0.9}, and it is connected to the first level node 402. Another second level node 408 has a fuzzy set of {a/0.3, h/0.1, i/0/9}, and it is connected to first level nodes 402 and 404. Finally, a third level node 410 is connected to second level nodes 406 and 408.

Figure 10:
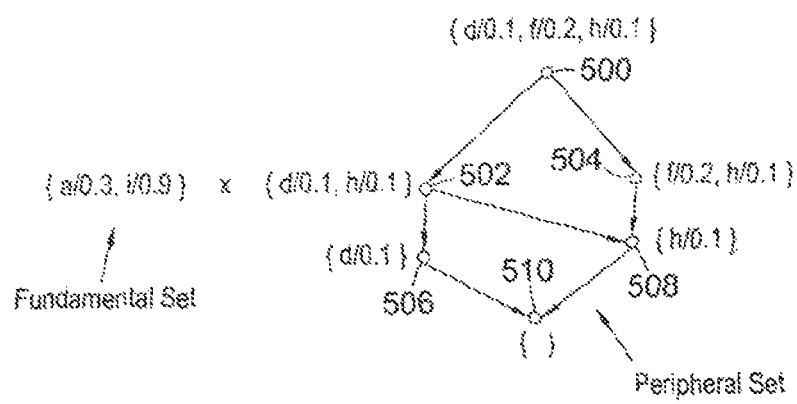
FIG. 10 illustrates a reduced subgroup lattice of the subgroup lattice of FIG. 9.

As shown in the FIG. 10, the elements in the fuzzy set of the lowest node 410 are extracted and expressed as a fundamental set. In this example, the extracted elements, a/0.3 and i/0.9, are also common elements in all the fuzzy sets in the subgroup lattice. The extracted fundamental set is used as the reduced lattice to replace the subgroup of lattices.

Step S2-3: The processor 302 replaces each of the subgroups of lattices with a corresponding reduced lattice.

The process terminates at step S2-4.

Figure 11:
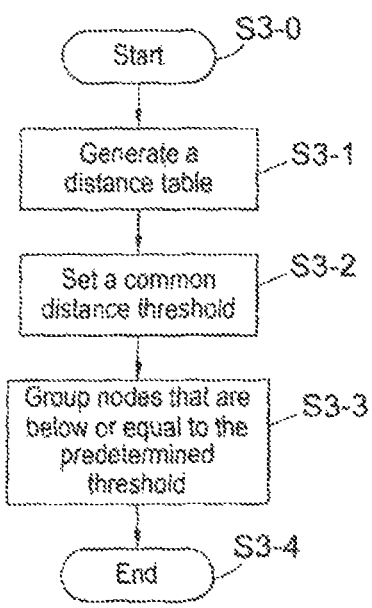
FIG. 11 is a flow chart showing a process for generating subgroups of lattices according to an embodiment of the invention.

The process of dividing the initial lattice diagram into subgroups of lattices will now be described with reference to the flow chart of FIG. 11. The process begins at step S3-0.

Step S3-1: The processor 302 generates a distance table.

Each node in the lattice diagram represents a pair of elements of the form (A, B) where A is a fuzzy set of objects, for example A={o1/0.2, o2/0.3}, and B is a crisp set of attributes, for example B={a1, a4}. The distance table represents the distance of each node with every other node in the lattice. A distance between two nodes represents a value in terms of insertion, deletion or substitution that is required to take place in order to transform one node (or concept) to another node. In other words, the distance represents the difference between the objects in each node and the objects in each of the remaining nodes in the initial lattice diagram.

Step S3-2: The processor 302 sets a predetermined common distance threshold. The distance threshold basically sets the limit in which the objects of a group of nodes that form a subgroup lattice should differ.

Step S3-3: The processor 302 clusters sets of nodes that have a distance that is equal to or below the predetermined distance threshold.

The process terminates at step S3-4.

Thus the invention in certain example embodiments provides users with a data structure that is less complex in appearance and represents more relevant, useful information. As described above, the method of the above described embodiment reduces the size of the initial lattice by removing redundant nodes such that reduced lattice contains only data items that represents relevant information. As a result, the data occupy less memory space and subsequent operations on or using the data are computationally more efficient.

In another embodiment of the invention, the above described methods and apparatus can be applied in a data retrieval system. For example, the user input devices 310 can be configured to receive user input, such as a search query term that is related to data items in a data source. A search process is carried out on the reduced lattice to retrieve data items that are related to the search query. This process is illustrated in FIG. 12.

Figure 12:
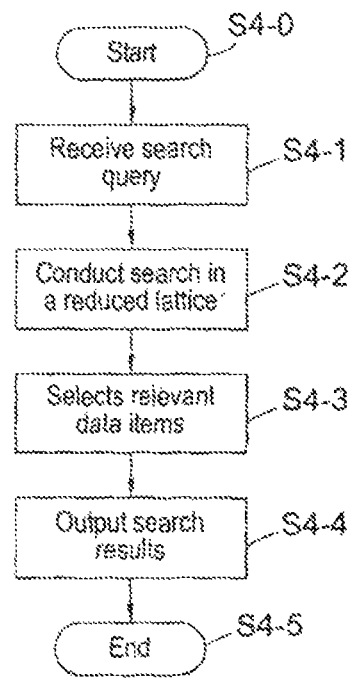
FIG. 12 is a flow chart showing a process for retrieving data from a data retrieval system according to another embodiment of the invention.

As shown in FIG. 12, the process commences at step S4-0.

Step S4-1: The user input device 310 receives a user input including a search query term.

Step S4-2: The processor 302 upon receiving the search query carries out a search in the reduced lattice.

Step S4-3: The processor 302 selects data items that are relevant to the search query.

Step S4-4: The processor 302 outputs the selected data items as search results.

The process terminates in step S4-5.

Figure 13:
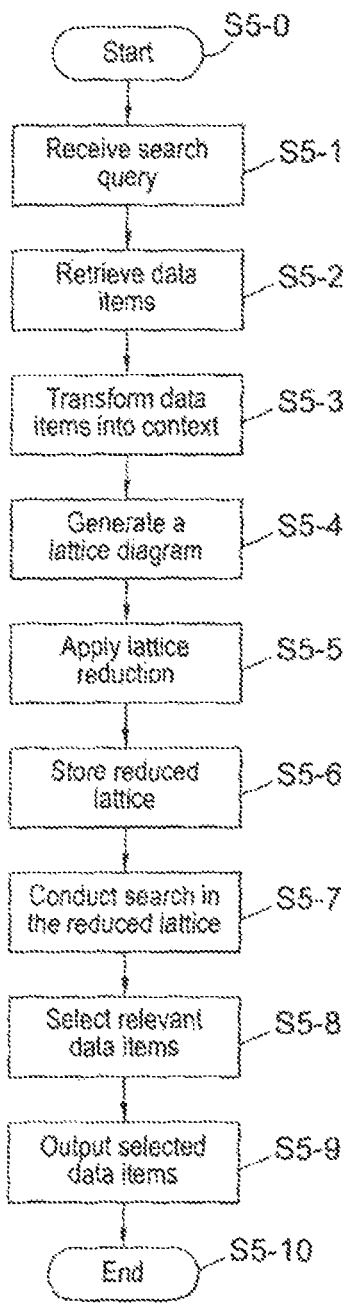
FIG. 13 is a flow chart showing a process for retrieving data from a data retrieval system according to yet another embodiment of the invention.

In another embodiment, lattice reduction can be carried out after a search query is received. Referring to FIG. 13, the process commences at step S5-0.

Step S5-1: The user input device 310 receives a user input defining a search query term.

Step S5-2: The processor 302 retrieves data items from a data source.

Step S5-3: The processor 302 transforms the retrieved data items into a context that defines conceptual relationships among the data items.

Step S5-4: The processor 302 generates an initial lattice diagram from the context using FCA.

Step S5-5: The processor 302 applies lattice reduction to the initial lattice diagram generated in step S5-4. The specific method of the lattice reduction is similar to that described in the preceding paragraphs.

Step S5-6: The processor 302 stores the reduced lattice in the data source. As the data items represented by the reduced lattice diagram is considerably smaller than the initial lattice diagram, the search can be conducted more efficiently.

Step S5-7: The processor 302 carries out the search in the reduced lattice.

Step S5-8: The processor 302 selects the data items that are relevant to the search query.

Step S5-9: The processor 302 provides an output including the selected data items to the output hardware device 312.

The process terminates at step S5-10.

One application of the above described embodiments is in an online shopping recommendation mechanism which is becoming increasingly popular on retail websites to recommend consumers in selecting suitable products. Currently, one of the common problems associated with this mechanism is that it often provides irrelevant recommendations together with relevant ones. The embodiments of the invention can therefore be applied to reduce the online shopping database and represent it in a reduced lattice data structure wherein each node of the reduced lattice represents a set of data objects (e.g. products) and a set of attributes. Upon receiving an input indicating that a product has been purchased by a user, the recommendation mechanism carries out a search through the reduced lattice to identify any other products that share the same attribute as the purchased product. As the lattice diagram has already been reduced, the search can therefore be performed more efficiently. The search is carried out in a region of the reduced lattice that contains nodes that have attributes that are relevant to the attribute of the purchased product. Thus the search is focused on a subset of nodes in the reduced lattice, i.e. "outlier" purchases would be ignored by the recommendation mechanism. Consequently, the selectivity of the search result is improved and the search is carried out in a shorter time.

Although specific embodiments of the invention have been described, further modifications are also possible. The code for each process in the methods according to the invention may be modular in the manner shown in the embodiments. Alternatively, the code may be arranged in an alternative way to perform the same function. The methods and apparatus according to the invention are applicable to any database or information retrieval system, such as a computer or a handheld device.

While the invention has been described in terms of what are at present its preferred embodiments, it will be apparent to those skilled in the art that various changes can be made to the preferred embodiments without departing from the scope the invention which is defined by the claims.

The invention claimed is:

1. A method for processing data items in a data source, wherein each of the data items comprises one or more properties associated therewith, the method comprising:
   determining a context defining relationships between the data items and the associated one or more properties;
   generating an initial lattice data structure based on said context, wherein said initial lattice comprises a plurality of nodes, a node representing one of said one or more properties, and one or more data items are associated with nodes of said plurality of nodes such that data items that are associated with the same node are associated with the same property; and
   reducing the initial lattice by removing nodes within the initial lattice such that the number of nodes in the reduced lattice is less than the number of nodes in the initial lattice, wherein the reducing further comprises dividing said initial lattice into a plurality of subgroups of lattice such that a subgroup of lattice comprises a subset of said plurality of nodes, and applying lattice reduction to reduce one or more of said subgroup of lattice,
   wherein the nodes in said subgroup of lattice are within a predetermined threshold distance of one another, the predetermined threshold distance representing a limit in which data items associated with nodes in a same subgroup lattice differs, the distance being a measure of a degree of insertion, deletion, or substitution that is required to transform a first node in the subgroup into a second node in the subgroup,
   wherein the initial lattice is not crispened prior to the reducing, the method further comprising:
   receiving user input including a search query term;
   searching through said reduced lattice to select at least one node from the reduced lattice based on said search query term; and
   providing an output representing at least one data item that is associated with said selected at least one node.

2. The method according to claim 1, wherein said subgroup of lattice is reduced by extracting a minimal node of said subgroup, the minimal node having one or more data items that associate with properties represented by nodes in said subgroup.

3. The method according to claim 2, further comprising combining said extracted minimal node of each of said subgroups of lattice to form the reduced lattice.

4. The method according to claim 1, wherein the data items and the associated properties in each node are, respectively, objects and attributes of a fuzzy set.

5. The method according to claim 1, wherein said context is represented as a table in an array of rows and columns, the rows being labelled by objects and the columns labelled by attributes.

6. A method for retrieving at least one data item relating to a search query term, the method comprising:
   receiving user input including a search query term;
   searching through a data source storing data items represented by a reduced lattice data structure generated by removing nodes within an initial lattice data structure such that the number of nodes in the reduced lattice is less than the number of nodes in the initial lattice;
   selecting at least one node from the reduced lattice based on said search query term; and
   providing an output comprising at least one data item that is associated with said selected at least one node,
   wherein the initial lattice is reduced by dividing said initial lattice into a plurality of subgroups of lattice such that a subgroup of lattice comprises a subset of nodes in the initial lattice, and applying lattice reduction to reduce one or more of said subgroup of lattice,
   wherein the nodes in said subgroup of lattice are within a predetermined threshold distance of one another, the predetermined threshold distance representing a limit in which data items associated with nodes in a same subgroup lattice differs, the distance being a measure of a degree of insertion, deletion, or substitution that is required to transform a first node in the subgroup into a second node in the subgroup, and
   wherein crispening prior to the reducing is not performed.

7. A non-transitory computer readable storage medium comprising computer executable instructions to cause a computer to become configured to perform a method according to claim 1.

8. An apparatus for processing data items in a data source, wherein each of the data items comprises one or more properties associated therewith, the apparatus comprising a processor operable to:
   determine a context defining relationships between the data items and the associated one or more properties;
   generate an initial lattice data structure based on said context, wherein said initial lattice comprises a plurality of nodes, a node representing one of said one or more properties, and one or more data items are associated with nodes of said plurality of nodes such that data items that are associated with the same node are associated with the same property; and
   reduce the initial lattice by removing nodes within the initial lattice such that the number of nodes in the reduced lattice is less than the number of nodes in the initial lattice,
   wherein said subgroup of lattice is reduced by extracting a minimal node of said subgroup, the minimal node having one or more data items that associate with properties represented by nodes in said subgroup, and the minimal node representing the objects that have all the properties in that subgroup,
   wherein the reducing further comprises dividing said initial lattice into a plurality of subgroups of lattice such that a subgroup of lattice comprises a subset of said plurality of nodes, and applying lattice reduction to reduce one or more of said subgroup of lattice, and
   wherein the nodes in said subgroup of lattice are within a predetermined threshold distance of one another, the predetermined threshold distance representing a limit in which data items associated with nodes in a same subgroup lattice differs, the distance being a measure of a degree of insertion, deletion, or substitution that is required to transform a first node in the subgroup into a second node in the subgroup, wherein the apparatus further comprises:
   a user input interface configured to receive user input including a search query term;
   a searching module for searching through said reduced lattice to select at least one node from the reduced lattice based on said search query term; and
   a data output interface configured to output at least one data item that is associated with said selected at least one node.

9. A system for retrieving at least one data item relating to a search query term, the system comprising:
   at least one hardware processor;
   a data source configured to store data items represented by a reduced lattice data structure generated by removing nodes within an initial lattice data structure such that the number of nodes in the reduced lattice is less than the number of nodes in the initial lattice;
   a user input interface configured to receive user input including a search query term;
   a searching module controlled by the at least one hardware processor and configured to search through said reduced lattice to select at least one node from the reduced lattice based on said search query term; and
   a data output interface configured to output at least one data item that is associated with said selected at least one node,
   wherein the initial lattice is reduced by dividing said initial lattice into a plurality of subgroups of lattice such that a subgroup of lattice comprises a subset of nodes in the initial lattice, each subgroup of lattice including at least one minimal and at least one maximal node, and applying lattice reduction to reduce one or more of said subgroup of lattice, and
   wherein the nodes in said subgroup of lattice are within a predetermined threshold distance of one another, the predetermined threshold distance representing a limit in which data items associated with nodes in a same subgroup lattice differs, the distance being a measure of a degree of insertion, deletion, or substitution that is required to transform a first node in the subgroup into a second node in the subgroup,
   wherein the initial lattice and each subgroup are fuzzy lattices and wherein the initial lattice is not crispened prior to the reducing.

10. The system according to claim 9, wherein:
   the reduced lattice data structure comprises a plurality of nodes, a node representing one or more properties associated with one or more said data items, and
   the reduced lattice is reduced from said initial lattice, using the at least one hardware processor, by extracting a minimal node of said subgroup, the minimal node having one or more data items that are associated with properties represented by nodes in said subgroup, and
   said extracted minimal node of each of said subgroups of lattice is combined using the at least one hardware processor to form the reduced lattice.

11. The method according to claim 1, wherein the initial lattice and each subgroup are fuzzy lattices.

12. The method according to claim 1, wherein at least some of the nodes in the initial lattice have intents and/or extents that include non-crisp values.

13. The method according to claim 6, wherein the initial lattice and each subgroup are fuzzy lattices.

14. The method according to claim 6, wherein at least some of the nodes in the initial lattice have intents and/or extents that include non-crisp values.

15. The system according to claim 9, wherein at least some of the nodes in the initial lattice have intents and/or extents that include non-crisp values.

* * * * *